United States Patent
Greene et al.

(10) Patent No.: US 10,780,641 B2
(45) Date of Patent: Sep. 22, 2020

(54) ENHANCED THREE DIMENSIONAL PRINTING OF VERTICAL EDGES

(71) Applicant: Holo, Inc., San Francisco, CA (US)

(72) Inventors: Richard M. Greene, San Rafael, CA (US); Brian James Adzima, San Francisco, CA (US); Stephen James Kranz, Oakland, CA (US)

(73) Assignee: HOLO, INC., Newark, CA (US)

( * ) Notice: Subject to any disclaimer, the term of this patent is extended or adjusted under 35 U.S.C. 154(b) by 409 days.

(21) Appl. No.: 15/719,118

(22) Filed: Sep. 28, 2017

(65) Prior Publication Data

US 2018/0086003 A1 Mar. 29, 2018

Related U.S. Application Data

(60) Provisional application No. 62/401,664, filed on Sep. 29, 2016.

(51) Int. Cl.
*B29C 64/393* (2017.01)
*B29C 64/135* (2017.01)
(Continued)

(52) U.S. Cl.
CPC .......... *B29C 64/393* (2017.08); *B29C 64/129* (2017.08); *B29C 64/135* (2017.08);
(Continued)

(58) Field of Classification Search
None
See application file for complete search history.

(56) References Cited

U.S. PATENT DOCUMENTS

| 5,403,680 A | 4/1995 | Otagawa et al. |
| 5,418,608 A | 5/1995 | Caimi et al. |

(Continued)

FOREIGN PATENT DOCUMENTS

| EP | 2 186 625 A2 | 5/2010 |
| EP | 3194145 A2 | 7/2017 |

(Continued)

OTHER PUBLICATIONS

Paul F. Jacobs, et al., "Rapid Prototyping & Manufacturing: Fundamentals of StereoLithography," Society of Manufacturing Engineers, Jan. 1992, pp. 87-97.
(Continued)

*Primary Examiner* — Monica A Huson
*Assistant Examiner* — Kelsey C Grace
(74) *Attorney, Agent, or Firm* — Wilson Sonsini Goodrich & Rosati

(57) ABSTRACT

Techniques and systems for enhancing vertical edges during photopolymer-based three-dimensional (3D) printing are described. A described technique includes accessing an original image corresponding to a slice of a 3D model prepared for printing on a 3D printer; accessing a pixel reduction factor that is associated with an increased exposure duration parameter; classifying pixels of the original image; reducing intensity levels of the interior pixels by the pixel reduction factor so that corresponding printing areas receive first curing doses under the increased exposure duration parameter and the reduced intensity levels that are comparable to doses received under an unmodified exposure duration parameter and unreduced intensity levels; maintaining intensity levels of the exterior pixels so that corresponding printing areas receive second curing doses under the increased exposure duration parameter that are greater than doses associated with the unmodified exposure duration
(Continued)

parameter; and outputting a resulting modified image for 3D printing.

20 Claims, 10 Drawing Sheets

(51) Int. Cl.
  *B33Y 10/00*   (2015.01)
  *B33Y 50/02*   (2015.01)
  *B33Y 30/00*   (2015.01)
  *B29C 64/129*  (2017.01)
  *G06T 11/00*   (2006.01)
  *G06T 17/00*   (2006.01)

(52) U.S. Cl.
  CPC .............. *B33Y 10/00* (2014.12); *B33Y 30/00* (2014.12); *B33Y 50/02* (2014.12); *G06T 11/00* (2013.01); *G06T 17/00* (2013.01)

(56) References Cited

U.S. PATENT DOCUMENTS

| | | |
|---|---|---|
| 5,982,342 A | 11/1999 | Iwata et al. |
| 6,500,378 B1 | 12/2002 | Smith et al. |
| 6,867,774 B1 | 3/2005 | Halmshaw et al. |
| 8,217,939 B1 | 7/2012 | Bonciu et al. |
| 8,582,118 B2 | 11/2013 | Takahashi et al. |
| 9,457,518 B2 | 10/2016 | Badhani et al. |
| 9,987,808 B2 | 6/2018 | Archer et al. |
| 10,252,468 B2 | 4/2019 | Greene et al. |
| 10,354,445 B2 | 7/2019 | Greene et al. |
| 2007/0107615 A1 | 5/2007 | Miyagawa et al. |
| 2010/0125356 A1 | 5/2010 | Shkolnik et al. |
| 2013/0297059 A1 | 11/2013 | Grifith et al. |
| 2014/0087140 A1 | 3/2014 | Benson et al. |
| 2014/0306955 A1 | 10/2014 | Dionne et al. |
| 2015/0137426 A1 | 5/2015 | Van Esbroeck et al. |
| 2015/0302116 A1 | 10/2015 | Howell et al. |
| 2016/0023403 A1 | 1/2016 | Ramos et al. |
| 2016/0185045 A1 | 6/2016 | Linnell et al. |
| 2016/0240003 A1 | 8/2016 | Frayne et al. |
| 2017/0061602 A1 | 3/2017 | Jang et al. |
| 2017/0102679 A1 | 4/2017 | Greene et al. |
| 2017/0283766 A1 | 10/2017 | Hribar et al. |
| 2017/0297099 A1 | 10/2017 | Gibson et al. |
| 2017/0326807 A1 | 11/2017 | Greene et al. |
| 2018/0020196 A1 | 1/2018 | Terada et al. |
| 2018/0071988 A1 | 3/2018 | Emamjomeh et al. |
| 2018/0194066 A1 | 7/2018 | Ramos et al. |
| 2018/0215098 A1 | 8/2018 | Marozin et al. |

FOREIGN PATENT DOCUMENTS

| | | |
|---|---|---|
| WO | WO-2016022336 A2 | 2/2016 |
| WO | WO-2017062630 A1 | 4/2017 |

OTHER PUBLICATIONS

Co-pending U.S. Appl. No. 16/276,553, filed Feb. 14, 2019.
Co-pending U.S. Appl. No. 16/432,336, filed Jun. 5, 2019.
Hadipoespito et al. Digital Micromirror Device Based Microstereolithography for Micro Structures of Transparent Photopolymer and Nanocomposites. Solid Freeform Fabrication Proceedings. Aug. 19, 2003. pp. 13-24.
Lee et al. Development of a 3D printer using scanning projection stereolithography. Sci Rep. Apr. 23, 2015;5:9875.
Rezai et al. 1.2.4. Stereolithography. Stereolithography—an overview. Science Direct. 2012. Printed Oct. 24, 2018. 9 pages. URL:< https://www.sciencedirect.com/topics/materials-science/stereolithography.
Sun et al. Projection micro-stereolithography using digital micro-mirror dynamic mask. Sensors and Actuators A: Physical. vol. 121, Issue 1, May 31, 2005, pp. 113-120.
U.S. Appl. No. 15/287,205 Notice of Allowance dated Apr. 24, 2019.
U.S. Appl. No. 15/593,939 Notice of Allowance dated Dec. 20, 2018.
U.S. Appl. No. 15/593,939 Notice of Allowance dated Nov. 16, 2018.
Karl, et al. TI DLP® 'Diamond' Pixel. Karl Guttag on Technology, Feb. 2016, [online] (retrieved from http://www.kguttag.com/20 12/02/09/ti-dip-diamond -pixel/), 11 pages.
U.S. Appl. No. 15/287,205 Office Action dated Oct. 1, 2018.
Authorized Officer Iolanda Hazeleger, International Search Report and Written Opinion in PCT/US2016/055764, dated Jan. 20, 2017, 13 pages.
Co-pending U.S. Appl. No. 16/732,777, filed Jan. 2, 2020.
U.S. Appl. No. 16/276,553 Office Action dated Apr. 24, 2020.

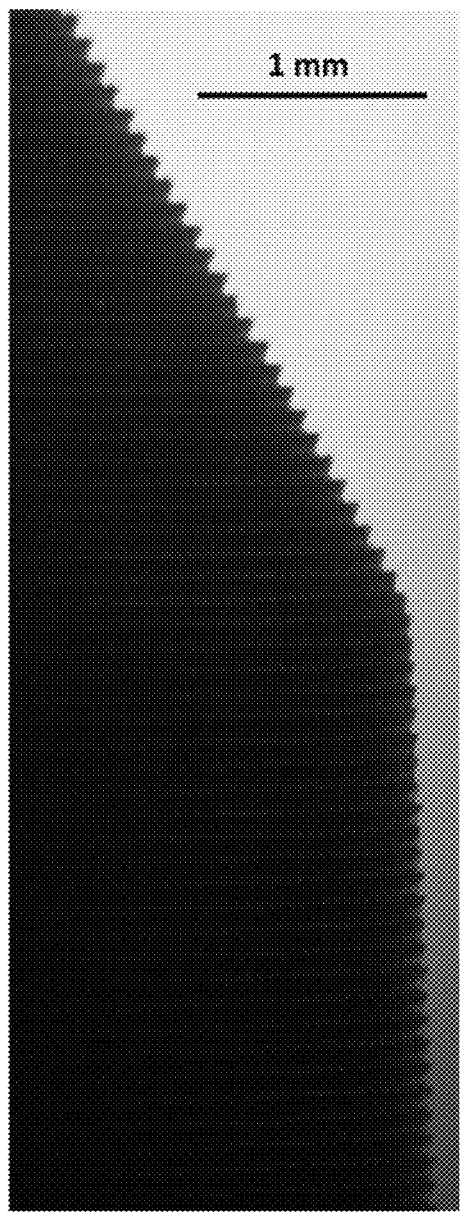
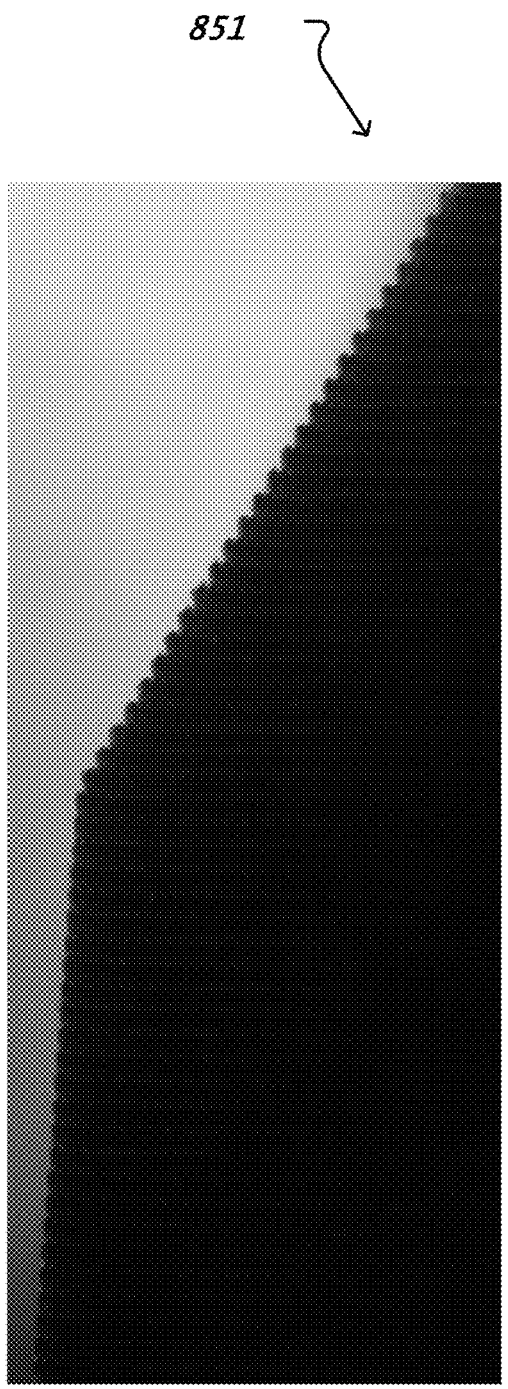
FIG. 8A  FIG. 8B

ENHANCED THREE DIMENSIONAL PRINTING OF VERTICAL EDGES

CROSS-REFERENCE TO RELATED APPLICATION

This patent document claims priority to U.S. Provisional Application No. 62/401,664, entitled "ENHANCED THREE DIMENSIONAL PRINTING OF VERTICAL EDGES" and filed on Sep. 29, 2016. The disclosure of the prior application is considered part of and is incorporated by reference herein in its entirety.

BACKGROUND

This patent document relates to three-dimensional (3D) printing using photopolymers.

Photopolymer-based 3D printers that use bottom-up illumination can project light upwards through an optically transparent window into a vat of photoactive resin to cure at least a portion of the resin. Such printers can build a 3D structure by forming one layer at a time, where a subsequent layer adheres to the previous layer. The light can be patterned to cause some portions of the resin to cure and other portions not to cure, thereby creating substructures of the 3D structure.

SUMMARY

This patent document describes technologies relating to enhancing vertical edges during photopolymer-based three dimensional (3D) printing. In one aspect, a described technique includes accessing, by a data processing apparatus, an original image corresponding to a slice of a three-dimensional model prepared for printing on a three-dimensional printer that uses a photopolymer to create a three-dimensional structure; accessing a pixel reduction factor that is associated with an increased exposure duration parameter, the increased exposure duration parameter being greater than an unmodified exposure duration parameter associated with the photopolymer; classifying pixels of the original image to identify interior pixels of the original image and exterior pixels of the original image; reducing intensity levels of the interior pixels by the pixel reduction factor so that printing areas of the three-dimensional printer corresponding to the interior pixels receive first curing doses under the increased exposure duration parameter and the reduced intensity levels that are comparable to doses received under an unmodified exposure duration parameter and unreduced intensity levels; maintaining intensity levels of the exterior pixels so that printing areas of the three-dimensional printer corresponding to the exterior pixels receive second curing doses under the increased exposure duration parameter that are greater than doses associated with the unmodified exposure duration parameter; and outputting a modified image based on the reduced intensity levels and the maintained intensity levels that correspond to the slice for printing on the three-dimensional printer. Other implementations can include corresponding systems, apparatus, and computer program products.

These and other implementations can include one or more of the following features. Implementations can include sending the modified image to the three-dimensional printer; and controlling the three-dimensional printer to use the increased exposure duration parameter when printing the slice in accordance with the modified image to build a portion of a three-dimensional structure. Controlling the three-dimensional printer to use the increased exposure duration parameter can include sending the increased exposure duration parameter to the three-dimensional printer. In some implementations, the increased exposure duration parameter is selected to increase a curing quality at edges of the three-dimensional structure, and the pixel reduction factor is selected based on the increased exposure duration parameter to eliminate or minimize over-curing for interior areas within the three-dimensional structure. Implementations can include reducing a build area represented by the original image to preserve dimensional accuracy under the increased exposure duration parameter. Classifying pixels of the original image can include using the reduced build area to identify the interior pixels and the exterior pixels. Classifying the pixels can include accessing neighboring pixels of a target pixel of the original image, the target pixel having an intensity level greater than a black intensity level; classifying the target pixel as an exterior pixel if one or more of the neighboring pixels have the black intensity level; and classifying the target pixel as an interior pixel if all of the neighboring pixels have an intensity level greater than the black intensity level.

Particular implementations disclosed herein can provide one or more of the following advantages. A described technology can be used to smooth out vertical edges in three-dimensional printing. A described technology can improve edge quality without over-curing interior areas. Further, a described technology can improve edge quality for thick slices, such as those of 100 microns thickness or greater. A described technology can be used to more accurately print a 3D structure.

Details of one or more implementations are set forth in the accompanying drawings and the description below. Other features and advantages may be apparent from the description and drawings, and from the claims.

BRIEF DESCRIPTION OF THE DRAWINGS

FIGS. 8A and 8B show edge views of an example of a 3D structure printed without and with edge enhancement from the same digital model.

Like reference numbers and designations in the various drawings indicate like elements.

DETAILED DESCRIPTION

Figure 1:
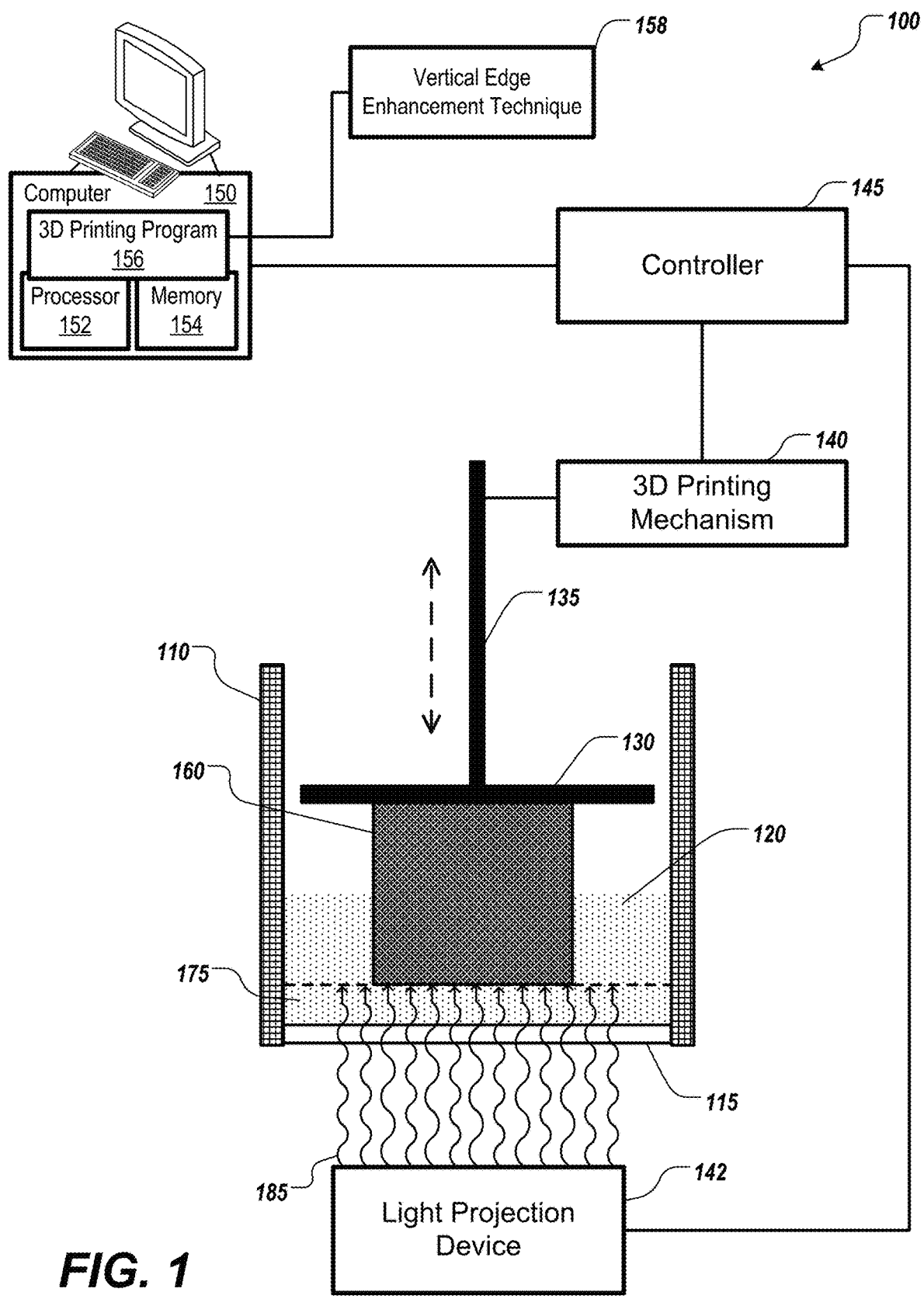
FIG. 1 shows an example of a 3D printing system coupled with a computer.

FIG. 1 shows an example of a 3D printing system 100 coupled with a computer 150. The computer 150 can provide information about a 3D structure to the 3D printing system 100 for printing. The computer 150 can communicate with a controller 145 of the printing system 100 via a wireline or wireless connection. The controller 145 can include integrated circuit technology, such as an integrated circuit board with embedded processor and firmware to control various system components such as a 3D printing mechanism 140 and a light projection device 142.

The system 100 includes a vat 110 to hold a liquid 120, which includes one or more photoactive resins. The vat 110 includes a window 115 in its bottom through which light is transmitted to cure resin to form a 3D printed structure 160 in a layer-by-layer build process. The 3D printed structure 160 is shown as a block, but as will be appreciated, a wide variety of complicated shapes can be 3D printed. The structure 160 is 3D printed on a build plate 130, which can be connected by a rod 135 to a 3D printing mechanism 140. The printing mechanism 140 can include various mechanical structures for moving the build plate 130 within the vat 110. This movement is relative movement, and thus the moving piece can be build plate 130, the vat 110, or both, in various implementations.

In some implementations, the window 115 includes a material such as polydimethylsiloxane (PDMS) to prevent resin from adhering to the window 115 during a curing procedure. Other techniques can be used to prevent resin from adhering to the window 115 such as a photo-inhibition technique that prevents resin from curing within a section of the vat 110 immediately above the window 115, while allowing resin to cure further away from the window 115.

The light projection device 142 can be positioned below the window 115. The controller 145 can operate the light projection device 142 to project a pattern of light 185 into the vat 110 to form substructures of the structure 160. The light 185 has a wavelength which is used to create the 3D structure 160 on the build plate 130 by curing the photoactive resin in the liquid 120 within a photo-initiation region 175, in accordance with a defined pattern or patterns. The wavelength can be selected based on the characteristics of the photoactive resin in the liquid 120. The build plate 130 can start at a position near the bottom of the vat 110, and varying patterns of the light 185 are directed through the window 115 to create layers of the solid structure 160 as the build plate 130 is raised out of the vat 110 by the printing mechanism 140. In some implementations, the printing mechanism 140 can employ a stepwise separation mechanism that raises the build plate 130 by a predetermined amount after each layer completion, e.g., after a predetermined curing time. In some implementations, the printing mechanism 140 can include mechanisms to aid in separation, e.g., by providing a rotation out of the plane of FIG. 1. In some implementations, the printing mechanism 140 can employ a continuous separation mechanism that continuously raises the build plate 130.

The light projection device 142 can be configured to modulate its light output based on a two dimensional grid of pixels. In some implementations, the light projection device 142 can include a pixel addressable filter to allow controlled amounts of light to pass at some pixel locations while blocking or deflecting light at other pixel locations from a light source within the light projection device 142. A pixel addressable filter can include a digital micro-mirror device (DMD). In some implementations, the light projection device 142 can include a pixel addressable light source to produce controlled amounts of light at some pixel locations and not produce light at other pixel locations. In some implementations, the light projection device 142 includes a liquid crystal display (LCD) device, discrete light emitting diode (LED) array device, laser, or a digital light processing (DLP) projector.

In some implementations, the 3D printing system 100 can include sensors and be designed to modify its operations based on feedback from these sensors. For example, the 3D printing system 100 can use closed loop feedback from sensors in the printer to improve print reliability. Such feedback sensors can include one or more strain sensors on the rod 135 holding the build plate 130 to detect if adhesion has occurred and stop and/or adjust the print, and one or more sensors to detect polymer conversion, such as a spectrometer, a pyrometer, etc. These sensors can be used to confirm that the 3D printing is proceeding correctly, to determine if the resin has been fully cured before the 3D printing system 100 proceeds to the next layer, or both. Moreover, in some implementations, one or more cameras can be used along with computer vision techniques to check that the print is proceeding as expected. Such cameras can be positioned under the vat 110 to examine the output, e.g., 3D printed layer, which the controller 145 can compare to the input, e.g., mask or layer image.

The computer 150 can include a processor 152, memory 154, and interfaces such as a network interface or a Universal Serial Bus (USB) interface. The processor 152 can be one or multiple processors, which can each include multiple processor cores. The memory 154 can include volatile memory such as Random Access Memory (RAM). The memory 154 can include non-volatile memory such as flash memory or read-only memory (ROM). The computer 150 can include one or more types of computer storage media and devices, which can include the memory 154, to store instructions of programs that run on the processor 152. For example, a 3D printing program 156 can be stored in the memory 154 and run on the processor 152 to implement the techniques described herein. In some implementations, the controller 145 can include the 3D printing program 156.

The 3D printing program 156 can transform a digital model into a sequence of layers that collectively describe the structure 160. The 3D printing program 156 can access a file containing mesh data that represents a digital model. Mesh data can include descriptions of geometric shapes such as polygons and their locations within the digital model. The 3D printing program 156 can map the digital model into three-dimensional discrete points called voxels. In some implementations, a voxel can be mapped to a pixel within a layer. In some implementations, the digital model can be sliced into grids of pixels and each pixel represents a voxel. A voxel can be fully contained within the digital model, partially contained within the digital model, or outside of the digital model. For example, a pixel corresponding to a voxel fully contained within the model can be assigned to a white intensity level which causes light to be projected onto a corresponding printing area to cure resin. A pixel corresponding to voxel partially contained within the model can be assigned to a grayscale intensity level which causes some light to be projected onto a corresponding printing area to cure some resin. A pixel corresponding to a voxel not contained within the model can be assigned to a black intensity level which causes light not to be projected onto a corresponding printing area so that resin does not cure; this type of pixel can be referred to as a black pixel or a non-printing pixel. The pixels on the exterior of the model are those that are either fully or partially contained but adjacent to one or more not contained pixels. The pixels on the interior of the model are those that are fully contained and adjacent to other pixels that are all either fully or partially contained.

The 3D printing program 156, the controller 145, or both can employ a vertical edge enhancement technique 158 to enhance vertical edges. The vertical edge enhancement technique 158 can use an increased exposure duration parameter to deliver greater than nominal curing doses to the one or more edges of the 3D printed structure 160 to form smoother vertical edges. Further, the vertical edge enhancement technique 158 can modify slice image data to increase curing at exterior pixels of a slice image and prevent over-curing at interior pixels of the slice image. Note that exterior pixels can correspond to the one or more edges of the 3D printed structure 160 and can be referred to as edge pixels. Based on the output of the vertical edge enhancement technique 158, the 3D printing program 156, the controller 145, or both can output layer information, such as graphic files or light modulation command sequences, that represent respective patterns of light to be generated for each layer of the model.

In more detail, the 3D printing program 156, the controller 145, or both can modify slice images by reducing the intensity values of interior portions, e.g., corresponding to interior pixels, of the objects to be printed from white to a dark gray (e.g., 25% of their original values) via the vertical edge enhancement technique 158. Portions of the slice images at the edges of objects are left at their original gray or white values. The exposure time can be increased in inverse proportion to the reduction of the interior values (e.g., by 400%), such that the interior portions receive the same dose as they would have with the original white at the original exposure time, while the edge regions receive a proportionately larger (e.g., 400% larger) dose. This can improve the verticality of the printed edges by providing them with a higher dose of light than is received by the interior portions of the print.

Figure 2A:
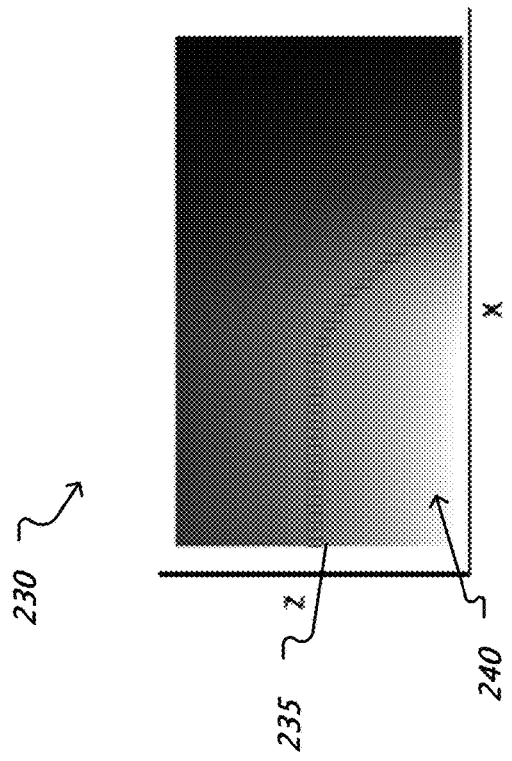
FIGS. 2A, 2B, 2C, and 2D show different intensity and curing profiles that motivate using a vertical edge enhancement technique.

FIGS. 2A, 2B, 2C, and 2D show different intensity and curing profiles that motivate using a vertical edge enhancement technique. FIG. 2A shows a graph 205 of an example of an intensity profile. The intensity profile represents a Gaussian-like fall-off in light intensity in the x-direction starting at the edge 208 of an exposed region in a slice. Here, pixels to the left of the edge 208 are illuminated, whereas pixels to the right of the edge 208 are not.

Figure 2C:
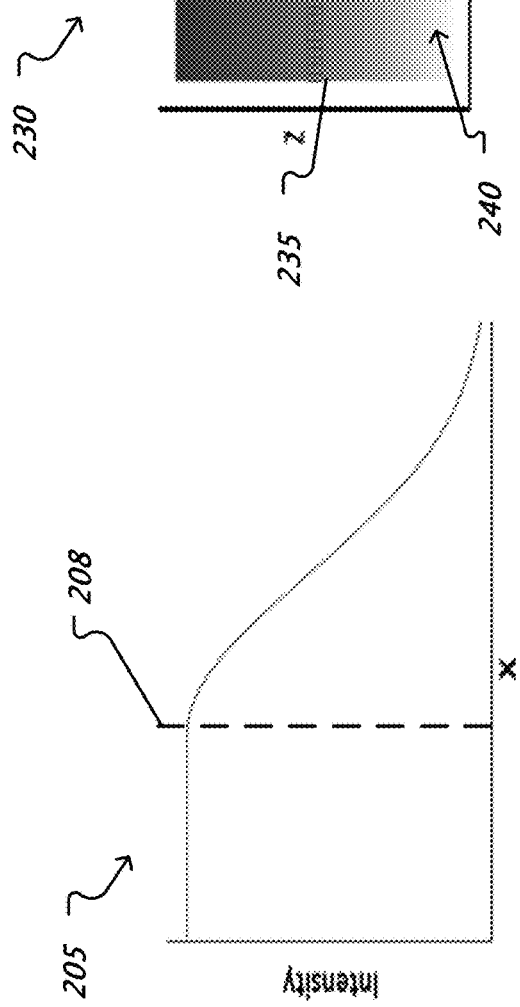
Figure 2B:
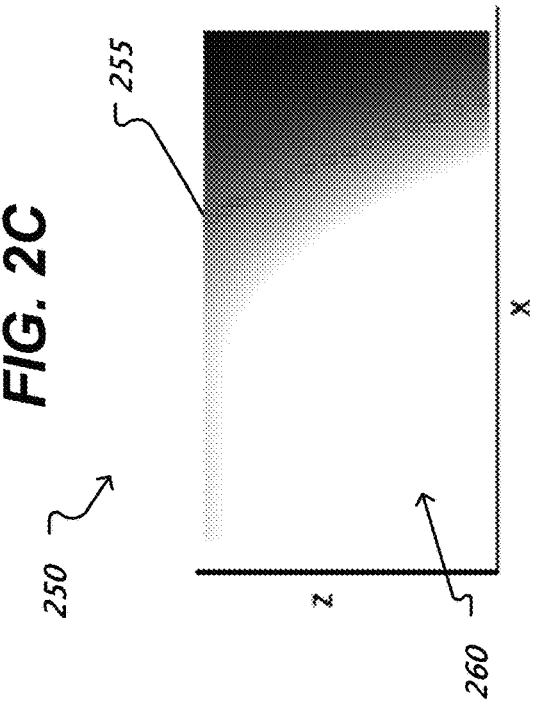

FIG. 2B shows a cross-section of an example of a curing profile 210 without absorption. Since there is no absorption in this theoretical example, the curing region 220 extends fully and vertically in the z-direction. Due to the fall-off shown in FIG. 2A in the x-direction, the curing region 220 gradually stops at the curing threshold 215 in the x-direction. Areas to the right of the curing threshold 215 do not receive a sufficient dose to cure a photopolymer.

FIG. 2C shows a cross-section of an example of a curing profile 230 that experiences absorption under a nominal curing dose. The nominal curing dose is associated with a nominal exposure duration parameter. Since there is absorption in this example, the curing region 240 gradually stops at the curing threshold 235 in the z-direction. Due to the fall-off shown in FIG. 2A in the x-direction, the curing region 240 gradually stops at the curing threshold 235 in the x-direction.

Figure 2D:
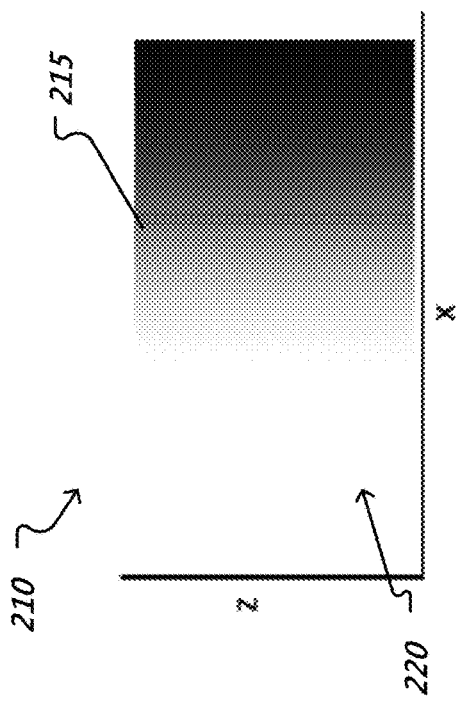

FIG. 2D shows a cross-section of an example of a curing profile 250 that experiences less absorption using a greater than nominal curing dose associated with a vertical edge enhancement technique. Here, the vertical edge enhancement technique uses an increased exposure duration parameter to provide a greater than nominal curing dose at the edge. Since there is absorption in this example, the curing region 260 gradually stops at the curing threshold 255 in the z-direction. Due to the fall-off shown in FIG. 2A in the x-direction, the curing region 260 gradually stops at the curing threshold 255 in the x-direction. However, with the greater than nominal dose used with this curing profile 250, the curing threshold 255 is pushed out farther in the z-direction, e.g., a greater volume of photopolymer is cured, when compared to the curing threshold 235 of FIG. 2C under the nominal dose. Such a push out can result in smoother edges between layers.

Figure 3A:
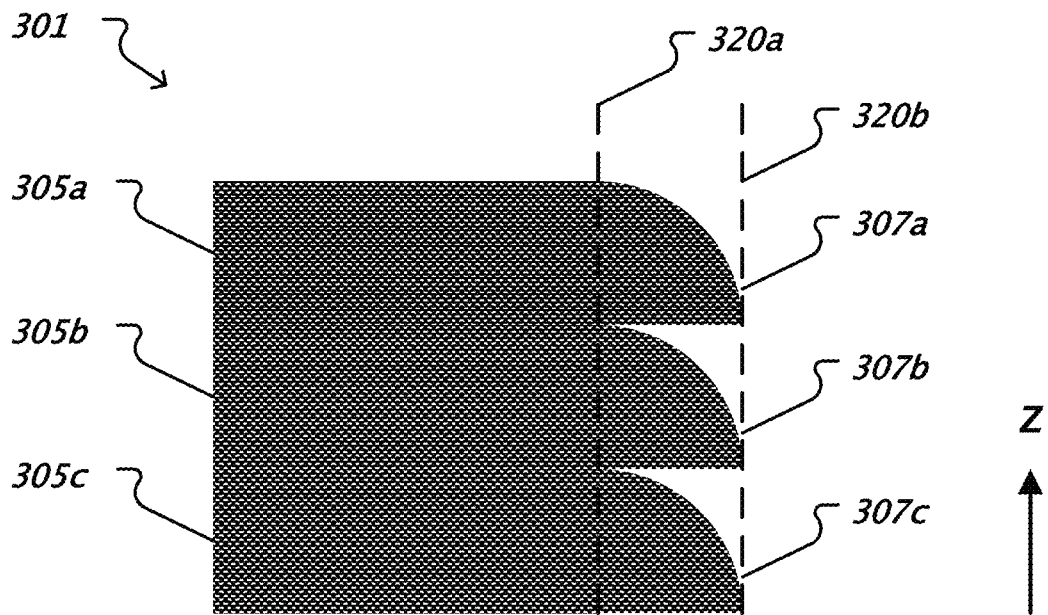
FIGS. 3A and 3B respectively show cross-sections of an example of multiple printed layers of a 3D structure that are printed without and with vertical edge enhancement.
Figure 3B:
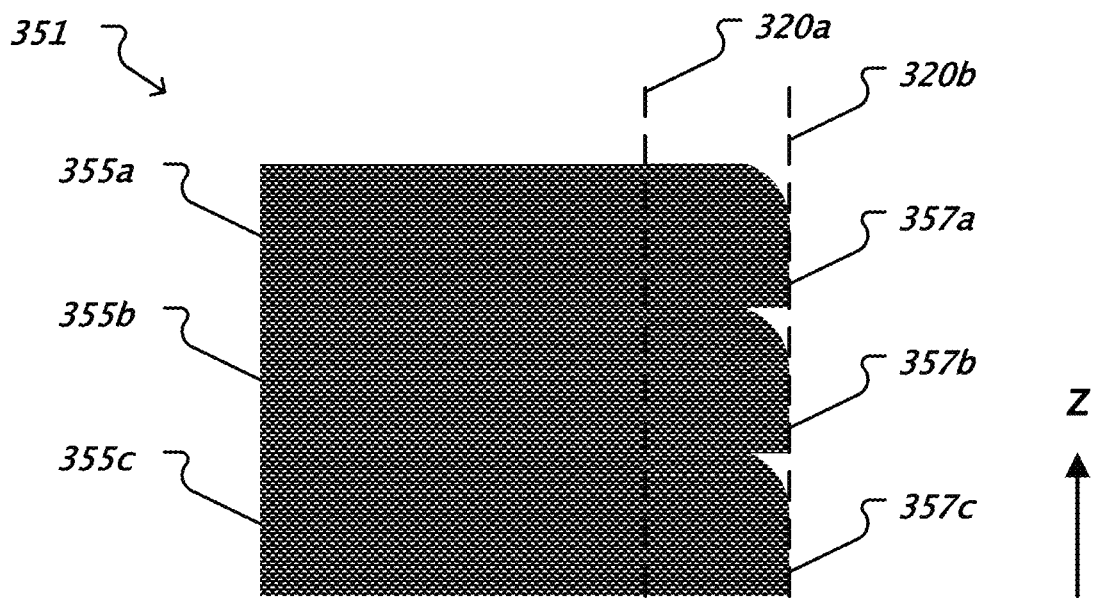

FIGS. 3A and 3B respectively show cross-sections of an example of multiple printed layers of a 3D structure that are printed without and with vertical edge enhancement. FIG. 3A shows a cross-section of an example of multiple printed layers 305a, 305b, 305c of a 3D structure 301 that are printed without vertical edge enhancement. The printed layers 305a-c exhibit scalloping due to absorption losses using nominal curing doses associated with a nominal exposure duration parameter. For example, the curved shaded regions 307a, 307b, 307c, representing cured resin, do not fully extend from a left side 320a of a printing region corresponding to an exterior pixel to a right side 320b of the printing region for each of the layers 305a-c. Note that the right side 320b of the printing region represents an edge of the 3D structure 301. The reason for the uncured areas of each printing region is explained above with respect to FIG. 2C.

FIG. 3B shows a cross-section of an example of multiple printed layers 355a, 355b, 355c of a 3D structure 351 that are printed with vertical edge enhancement. Vertical edge enhancement can minimize scalloping due to absorption losses by using a greater than nominal curing dose. For example, the partially curved shaded regions 357a, 357b, 357c, representing cured resin, extend further from a left side 320a of a printing region corresponding to an exterior pixel to a right side 320b of the printing region for each of the layers 355a-c than the respective layers 305a-c of FIG. 3A. Note that the right side 320b of the printing region represents an edge of the 3D structure 351. The reason for the greater area of cured resin is explained above with respect to FIG. 2D.

Figure 4:
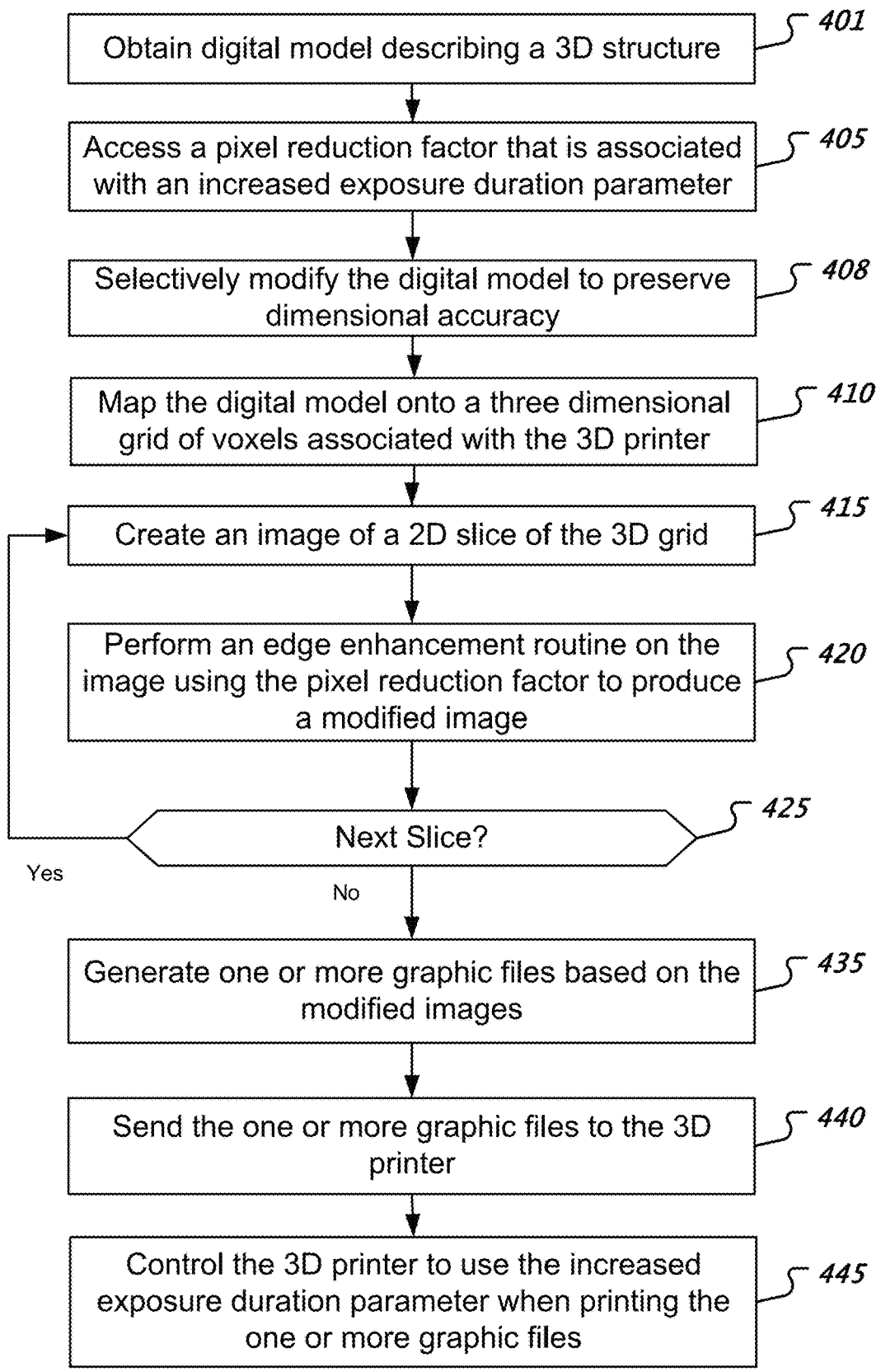
FIG. 4 shows a flowchart of an example of a process that enhances edges of a 3D digital model for manufacturing with a 3D printer.

FIG. 4 shows a flowchart of an example of a process that enhances edges of a 3D digital model for manufacturing with a 3D printer. A device such as a printer controller or a computer can perform this process. At 401, the process obtains a digital model that describes a 3D structure. Obtaining a digital model can include accessing a file that defines the meshes that cover the surface of the structure. The file can be in a format such as the STL (STereoLithography) file format or the Polygon File Format (PLY). Other types of file formats are possible. In some implementations, the file can identify a list of voxels, or other representation thereof, that are included in the structure. In some implementations, the digital model is received over a network connection. For example, a user can upload a digital model to a server on the Internet for manufacturing with a 3D printer. In some implementations, a digital model can be created from actual objects. For example, a 3D scanner such as Magnetic resonance imaging (MRI) scanner, computed tomography (CT) scanner, or laser scanner can be used to generate digital models. In some implementations, a digital model can be generated by different images of an object. In some implementations, a digital model can be generated based on a microtome sectioning process.

At 405, the process accesses a pixel reduction factor that is associated with an increased exposure duration parameter. The increased exposure duration parameter can increase curing at the edges during 3D printing, while the pixel reduction factor can prevent over-curing at interior areas during 3D printing. Accessing a pixel reduction factor can include retrieving a value from a database or a value embedded in a software program. In some implementations, the pixel reduction factor is determined based on a pixel factor determination process; see, e.g., the process of FIG. 7. In some implementations, the pixel reduction factor is determined slice-by-slice based on the digital model.

At 408, the process can selectively modify the digital model to preserve dimensional accuracy. For example, using the increased exposure duration parameter may cause thicker edges to develop during printing, and eroding the original image may be required to preserve dimensional accuracy. In some implementations, if it is determined that edge enhancement would thicken one or more edges by more than a predetermined threshold, the process can reduce, e.g., shrink, one or more build areas represented by the digital model to preserve dimensional accuracy under the increased exposure duration parameter. In some implementations, build area reduction can occur later in the process such as when individual slices undergo edge enhancement.

At 410, the process maps the digital model onto a three dimensional grid of voxels associated with a 3D printer. Mapping the digital model can include identifying voxels that are fully contained within the digital model, voxels that are partially contained within the digital model, and voxels that are outside of the digital model. In some implementations, the process can receive one or more parameters that describe the capabilities of the 3D printer such as resolutions in the X, Y, and Z dimensions, and maximum sizes for each dimension. The process can use these parameters to determine the number and shape of voxels for the grid. In some implementations, each voxel in the grid can correspond to a voxel that the 3D printer can form. In some implementations, each voxel in the grid can correspond to a pixel that the 3D printer can form within a layer. In some implementations, a voxel is sliced in an X-Y plane at its midpoint location along the printer's formation axis, e.g., Z axis, which is perpendicular to that plane, to form a corresponding pixel.

At 415, the process creates an image of a 2D slice of the 3D grid. Creating an image can include accessing a rectangular slice of the 3D grid, where the slice is perpendicular to the direction of printing. Voxels, and their corresponding pixels within the image, are assigned a white intensity level if they are a part of the 3D structure, e.g., corresponding to points that should be cured. Voxels, and their corresponding pixels within the image, are assigned a black intensity level if they are not a part of the 3D structure, e.g., corresponding to points that should not be cured. In some implementations, intensity levels can be represented as 8-bit values that range from 0 (black) to 255 (white). The white intensity level is sufficient to cure photoactive resin during a predetermined curing time for a layer. In some implementations, the white intensity level is a percentage (e.g., 90% or 95%) of a maximum intensity level generated by a 3D printer; in this case, the maximum intensity level exceeds an intensity level sufficient to cure photoactive resin. Note that different photoactive resins can require different curing intensities, durations, or both. In some implementations, the process creates a slice of a specified thickness, uses mesh data to generate a 2D image at that slice, and uses the specified slice thickness to set the exposure duration for that slice.

At 420, the process performs an edge enhancement routine on the 2D slice image using the pixel reduction factor to produce a modified image. The edge enhancement routine can include reducing intensity levels of the interior pixels by the pixel reduction factor and maintaining intensity levels of the exterior pixels and black pixels. See FIGS. 5 and 6 for examples of an edge enhancement routine. At 425, the process determines whether there is a next slice to create. If so, the process loops back to 415 to create another slice. If there are no more slices, then the process continues at 435. In some implementations, all slice images are created, and then the edge enhancement routine is applied to each of the slice images. In some implementations, a batch of slice images is created, and then the edge enhancement routine is applied to each of the slice images in the batch, together or in sequence, e.g., a 3D printer can process a small number of slices (e.g., 2-5 slices) at a time in a processing pipeline, and the edge enhancement routine can operate on each slice (as appropriate for that slice) in the processing pipeline in turn.

At 435, the process generates one or more graphic files based on the modified images. In some implementations, the digital model is sliced into N layers in the Z dimension and the process outputs a graphic file such as a file in accordance with a file format such as Portable Network Graphics (PNG) for each layer. In some implementations, the process outputs a graphic file containing multiple images for respective layers. Note that pixels within an image for a slice may not be modified for various reasons such as a slice's lack of containment within the 3D structure, e.g., a slice's lack of interior pixels, but such an image may be deemed as a modified image, nonetheless, due to the image being analyzed by the edge enhancement routine at 420.

At 440, the process sends the one or more graphic files to the 3D printer. At 445, the process controls the 3D printer to use the increased exposure duration parameter when printing the one or more graphic files. In some implementations, the process controls the 3D printer by sending the increased exposure duration parameter together with the one or more graphic files. In some implementations, an increased exposure duration parameter is embedded as metadata within the one or more graphic files. In some implementations, sending information such as the one or more graphic files and the one or more exposure duration parameters can include transmitting data via a network connection (e.g., wireline or wirelessly) or Universal Serial Bus (USB). In some implementations, a 3D printer can receive the digital model itself, perform the process of FIG. 4, and send the contents of the one or more graphic files to a light projection device within the 3D printer. Sending the contents can include transmitting a sequence of bits over a serial bus between a controller and a projection system. In some implementations, a standalone computer performs the process of FIG. 4 and sends the contents of the one or more graphic files to the 3D printer via a wireline or wireless connection. In some implementations, the process can determine an exposure duration on a per-slice basis. As such, a print job can use two or more different exposure durations for two or more respective slices. Moreover, the process can use a longer duration for at least the initial slice that is printed directly on the build plate to help provide a solid foundation for subsequent slices.

Figure 5:
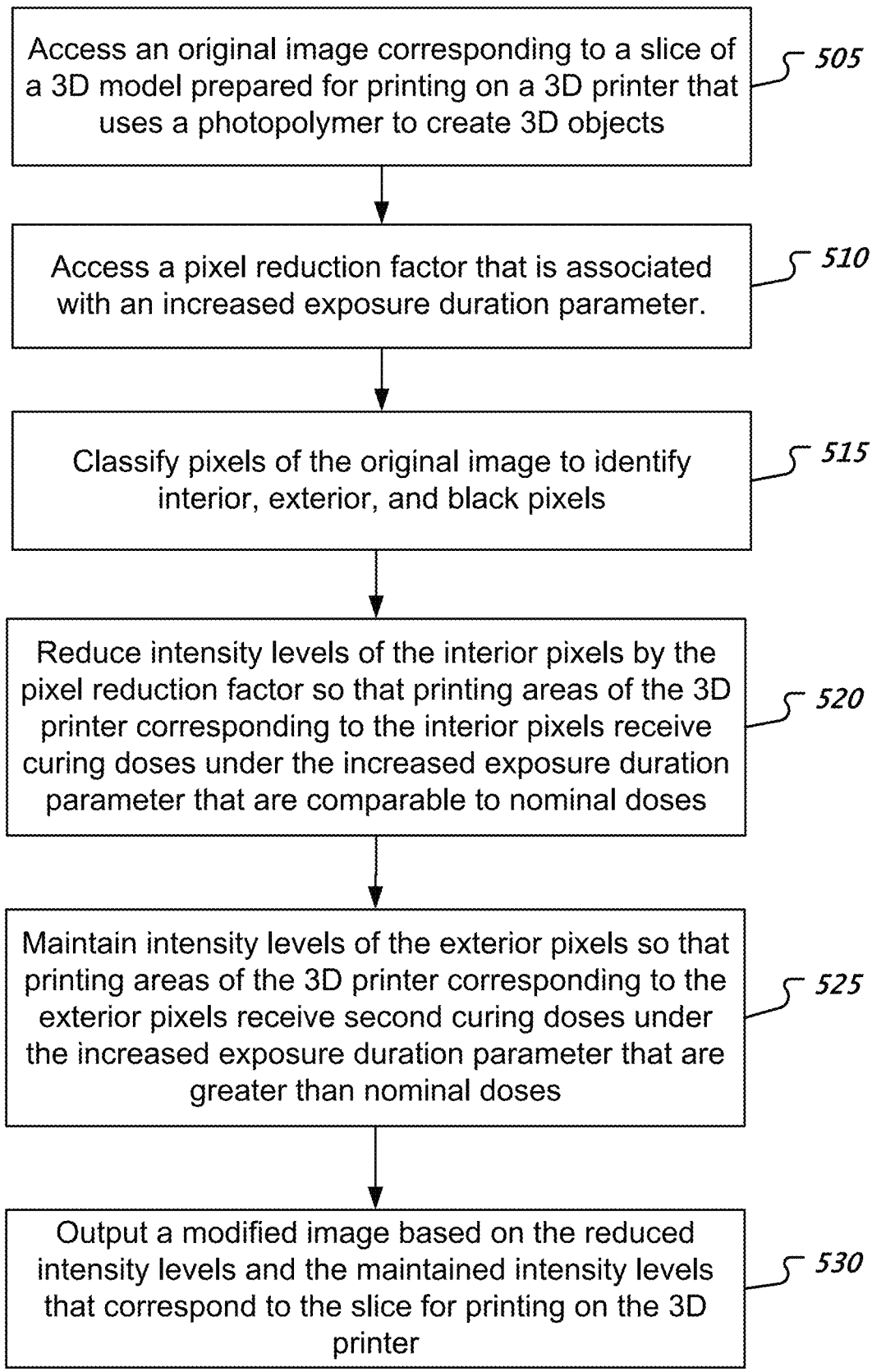
FIG. 5 shows a flowchart of an example of a process that performs an edge enhancement routine.

FIG. 5 shows a flowchart of an example of a process that performs an edge enhancement routine. A device such as a printer controller or a computer can perform this process. At 505, the process accesses an original image corresponding to a slice of a 3D model prepared for printing on a 3D printer that uses a photopolymer to create 3D objects. Accessing an original image can include retrieving an image from a multi-image file or a single-image file. At 510, the process accesses a pixel reduction factor that is associated with an increased exposure duration parameter. The increased exposure duration parameter is greater than an unmodified, e.g., nominal, exposure duration parameter associated with the photopolymer. In some implementations, the pixel reduction factor is a fixed parameter within the process. In some implementations, the pixel reduction factor is passed as a variable. In some implementations, the pixel reduction factor is determined based on a pixel factor determination process; see, e.g., the process of FIG. 7.

At 515, the process classifies pixels of the original image to identify interior, exterior, and black pixels. In some implementations, the process includes accessing neighboring pixels of a target pixel of the original image, the target pixel having an intensity level greater than a black intensity level. The process can classify the target pixel as an exterior pixel based on one or more of the neighboring pixels having the black intensity level. The process can classify the target pixel as an interior pixel based on all of the neighboring pixels having an intensity level greater than the black intensity level. Note that grayscale input values for input intensity levels are possible. In some implementations, the process can use a high-pass filtering technique such as a technique based on a Sobel filter or a Cany filter to classify pixels. In some implementations, the process includes reducing a build area represented by the original image to preserve dimensional accuracy under the increased exposure duration parameter. For example, using the increased exposure duration parameter may cause thicker edges to develop during printing, and eroding the original image may be required. Thus, classifying pixels of the original image, at 515, can include using the reduced build area to identify interior, exterior, and black pixels.

At 520, the process reduces intensity levels of the interior pixels by the pixel reduction factor so that printing areas of the 3D printer corresponding to the interior pixels receive curing doses that are comparable to nominal doses. For such pixels, doses received under the reduced intensity levels and the increased exposure duration parameter are comparable to doses received under an unmodified exposure duration parameter and unreduced intensity levels. In some implementations, reducing an intensity level can include retrieving a pixel intensity level from an input image buffer, reducing the level, and writing the reduced level to an output image buffer. In some implementations, reducing an intensity level can include reading a value from an array, reducing the value, and writing the reduced value back to the array. In some implementations, comparable doses are the same doses or about the same, e.g., within a 1% or a 5% variance from the original doses.

At 525, the process maintains intensity levels of the exterior pixels so that printing areas of the 3D printer corresponding to the exterior pixels receive second curing doses under the increased exposure duration parameter that are greater than nominal doses. Nominal doses for such pixels correspond to doses received under an unmodified exposure duration parameter. In some implementations, maintaining an intensity level can include copying a pixel intensity level from an input image buffer to an output image buffer. In some implementations, maintaining an intensity level can include leaving a pixel intensity level unchanged.

At 530, the process outputs a modified image based on the reduced intensity levels and the maintained intensity levels that correspond to the slice for printing on the 3D printer. Outputting a modified image can include dumping the contents of an output image buffer into an image file.

Figure 6:
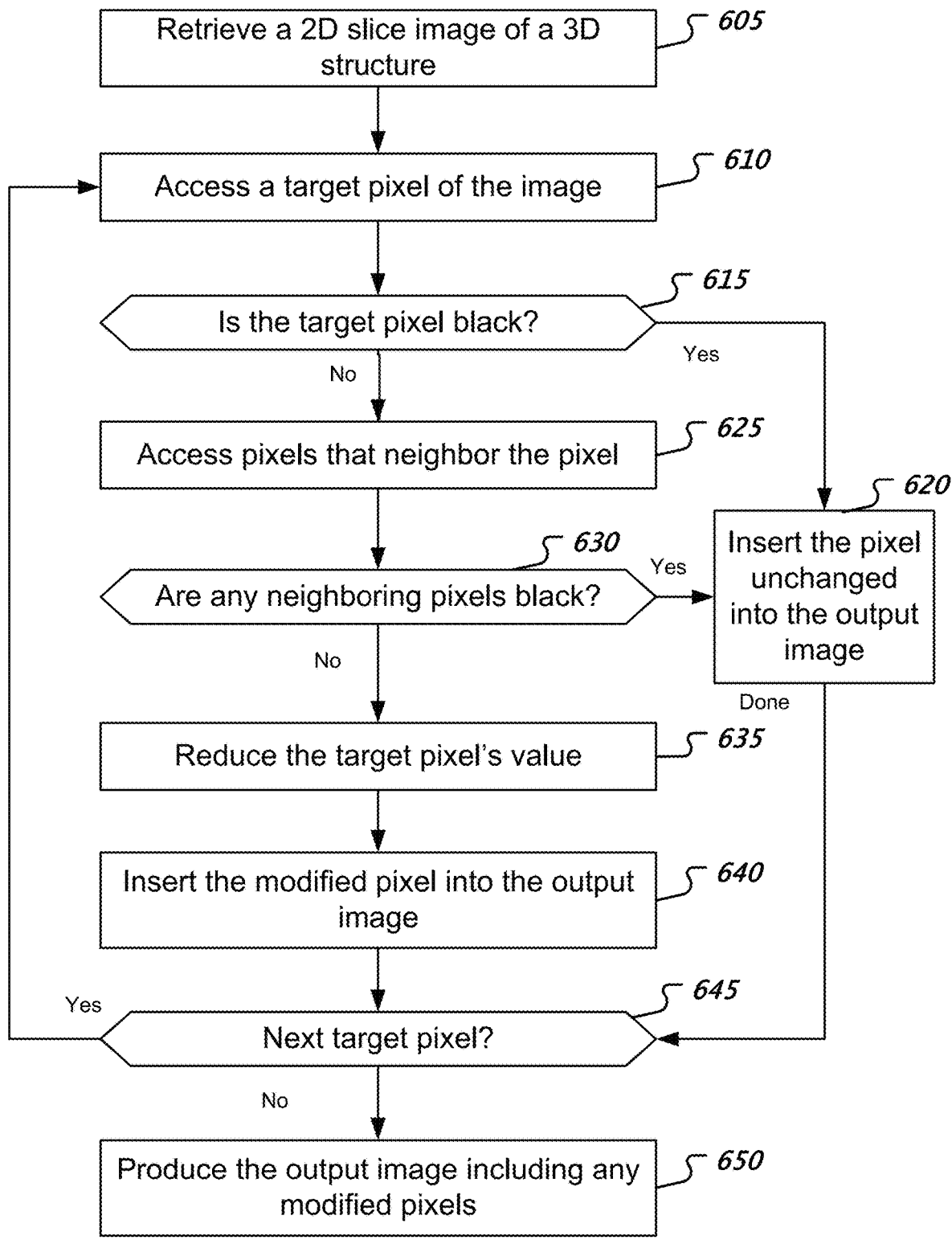
FIG. 6 shows a flowchart of another example of a process that performs an edge enhancement routine.

FIG. 6 shows a flowchart of another example of a process that performs an edge enhancement routine. At 605, the process retrieves a 2D slice image of a 3D structure. At 610, the process accesses a target pixel of the image. Accessing a target pixel can include retrieving a pixel intensity value. At 615, the process determines whether the target pixel is black. Typically, a pixel intensity value of zero corresponds to a black pixel. In some implementations, pixel intensity values falling below a threshold can be classified as a black pixel and can be reassigned to be a zero intensity value. If the target pixel is black, then the process inserts the pixel unchanged into the output image at 620. Otherwise, the process continues at 625. In some implementations, inserting the pixel unchanged into the output image can include writing a pixel intensity level as-is to an output buffer.

To determine whether the pixel is an interior or exterior pixel, the process, at 625, accesses pixels that neighbor the target pixel. Accessing pixels that neighbor the target pixel can include retrieving intensity values for the pixel neighborhood of the target pixel. Typically, the pixel neighborhood includes eight adjacent pixels that immediately surround the target pixel in the same plane as the slice; however, less than eight pixels may be used if the target pixel is on or close to an image boundary. At 630, the process determines whether any neighboring pixels are black. If any neighboring pixels are black, then the target pixel is classified as an exterior pixel and the process, at 620, inserts the pixel unchanged into the output image at 620. If none of the neighboring pixels are black, then the target pixel is classified as an interior pixel and the process, at 635, reduces the target pixel's value. At 640, the process inserts the modified pixel into the output image. In some implementations, inserting the modified pixel unchanged into the output image can include writing a reduced pixel intensity level to an output buffer.

At 645, the process determines whether there is a next target pixel. In some implementations, the process iterates through each pixel of each row until the last pixel of the last row is processed. If there is a next target pixel, then process continues at 610. Otherwise, the process, at 650, produces the output image including any modified pixels. In some implementations, producing the output image can include dumping an output buffer into an image file. In some implementations, a process can extract edges from an original image into an extracted edge image by using one or more image processing techniques, such as by using Sobel or Cany filters. The process can reduce the values in the entire original image by a pixel reduction factor to produce a reduced version of the original image. The process can copy any non-black pixels in the extracted edge image back into the reduced version of the original image.

Figure 7:
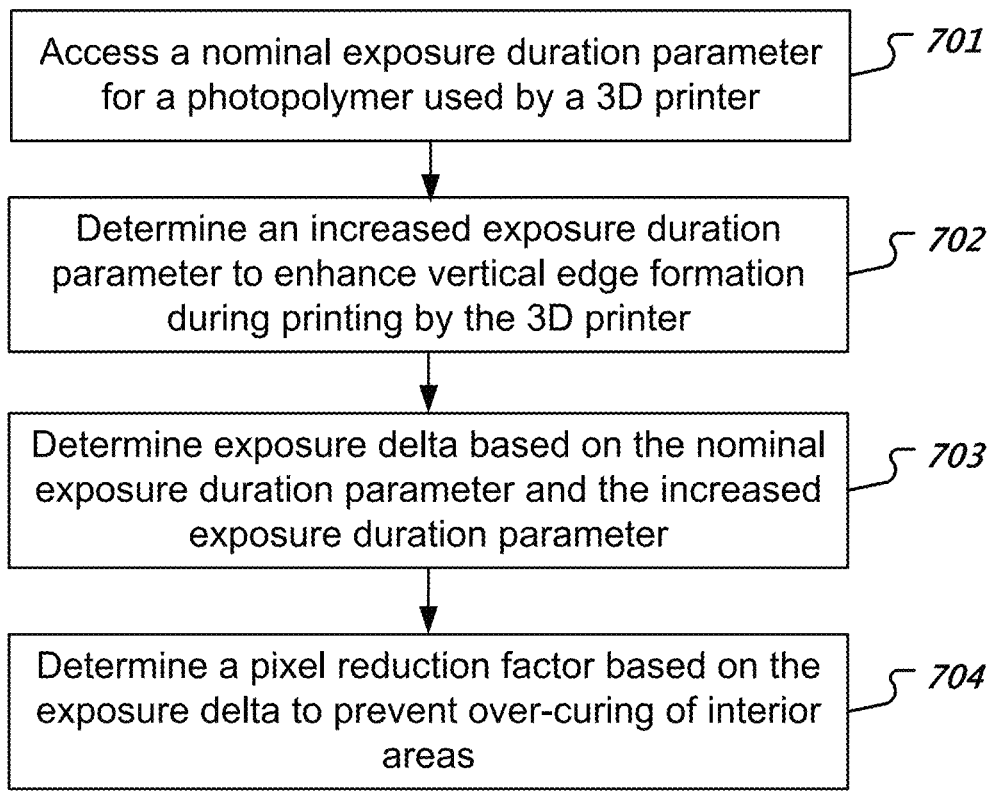
FIG. 7 shows a flowchart of an example of a process to determine an exposure duration parameter and a pixel reduction factor.

FIG. 7 shows a flowchart of an example of a process to determine an exposure duration parameter and a pixel reduction factor. A device such as a printer controller or a computer can perform this process. At 701, the process accesses a nominal exposure duration parameter for a photopolymer used by a 3D printer. Accessing a nominal exposure duration parameter can include retrieving a value stored in a database or a value embedded in a software routine. In some implementations, the process determines the nominal exposure duration parameter based on a slice thickness parameter, a resin type used by the 3D printer, a light source used by the 3D printer, or a combination thereof. At 702, the process determines an increased exposure duration parameter to enhance vertical edge formation during printing by the 3D printer. Note that the duration parameters can be expressed in any appropriate units such as seconds or milliseconds. The increased exposure duration parameter can improve curing quality at the edges. Determining an increased exposure duration parameter can include using a slice thickness parameter, a resin type used by the 3D printer, a light source used by the 3D printer, or a combination thereof. Note that there is a trade off between edge enhancement and exposure duration. The increase in edge fidelity can be expressed as the product of contrast between brightness of an exterior pixel and brightness of an interior pixel. If the brightness ratio of edge to interior is 4:1, the layer will take a 4× increase in exposure duration. Different ratios are possible. However, ratios past a threshold may result in diminishing returns and may harm print quality, e.g., loss of resolution in the XY plane caused by light spreading. Further, print time increases as the ratio increases due to the longer exposure durations.

At 703, the process determines an exposure delta based on the nominal exposure duration parameter and the increased exposure duration parameter. For example, if the nominal exposure duration parameter is two seconds, and the increased exposure duration parameter is 8 seconds, then the exposure delta is a factor of 400%. At 704, the process determines a pixel reduction factor based on the exposure delta to prevent over-curing of interior areas. In some implementations, the pixel reduction factor can be expressed as a percentage. Determining the pixel reduction factor can include computing an inverse of the exposure delta and using the inverse value as the pixel reduction factor, and accordingly, the product of the pixel reduction factor and the exposure delta is one. If the exposure delta is a factor of 400% for example, then a corresponding pixel reduction factor is 25%. In some implementations, the process can access a slice thickness parameter for a slice, and trigger edge enhancement to be performed based on the slice thickness exceeding a threshold. Further, the process can output a file that includes the final exposure duration values on a per-slice basis for use by the printer during printing.

FIGS. 8A and 8B show edge views of an example of a 3D structure printed without and with edge enhancement from the same digital model. The slices derived from the digital model to create the printed structure have a layer height of 100 microns. FIG. 8A shows an edge view 801 of an example of a 3D structure that was printed without vertical edge enhancement. For FIG. 8A, pixel intensity levels were left unchanged and a nominal exposure duration parameter of 2 seconds was used during printing. FIG. 8B shows an edge view 851 of the example of the 3D structure that was printed with vertical edge enhancement. For FIG. 8B, pixel intensity levels of interior pixels were reduced and a greater than nominal exposure duration parameter of 8 seconds was used during printing. As compared to FIG. 8A, scalloping is reduced in FIG. 8B.

Figure 9A:
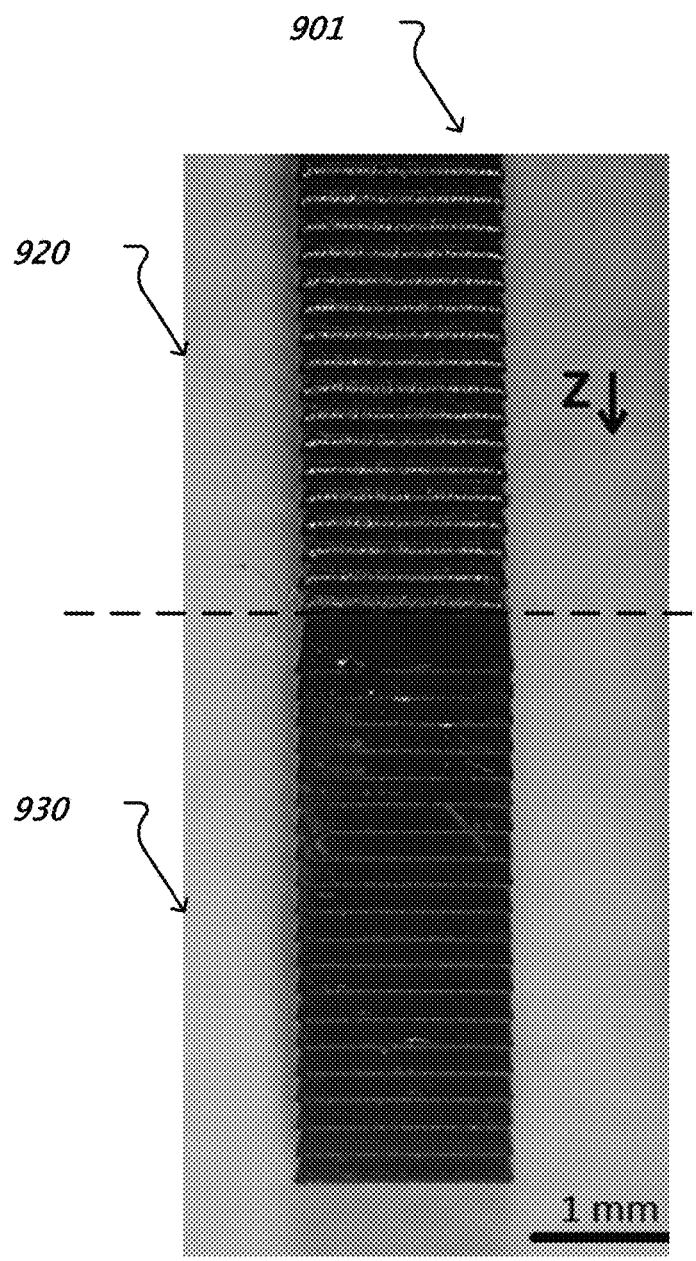
FIGS. 9A, 9B, 9C, 9D, and 9E show images associated with another example of a 3D structure printed without and with edge enhancement from the same digital model.
Figure 9B:
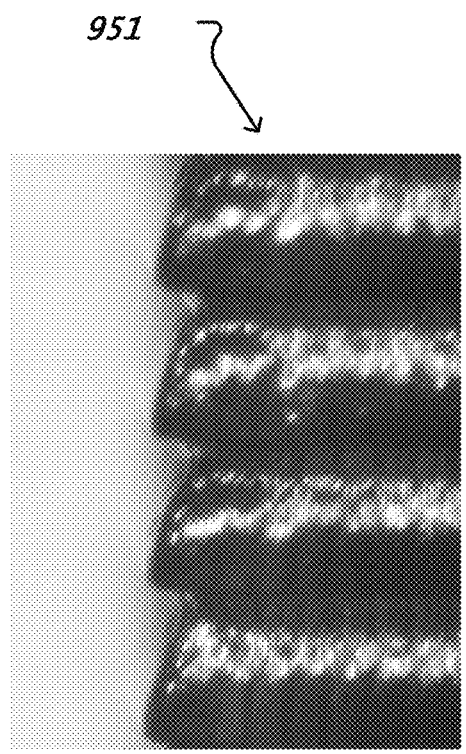
Figure 9C:
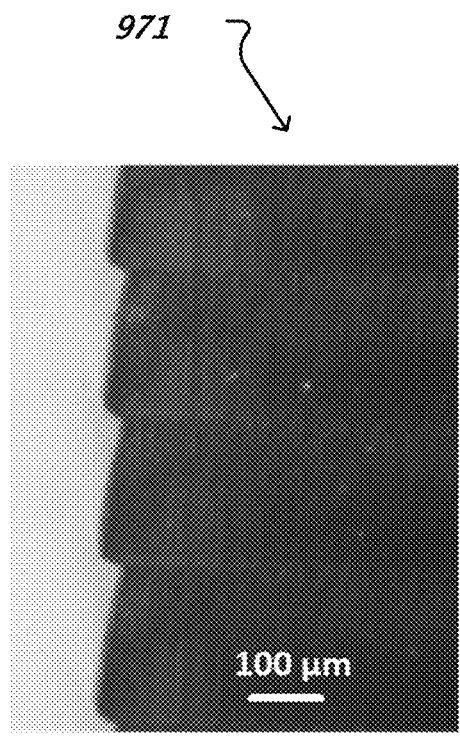
Figure 9D:
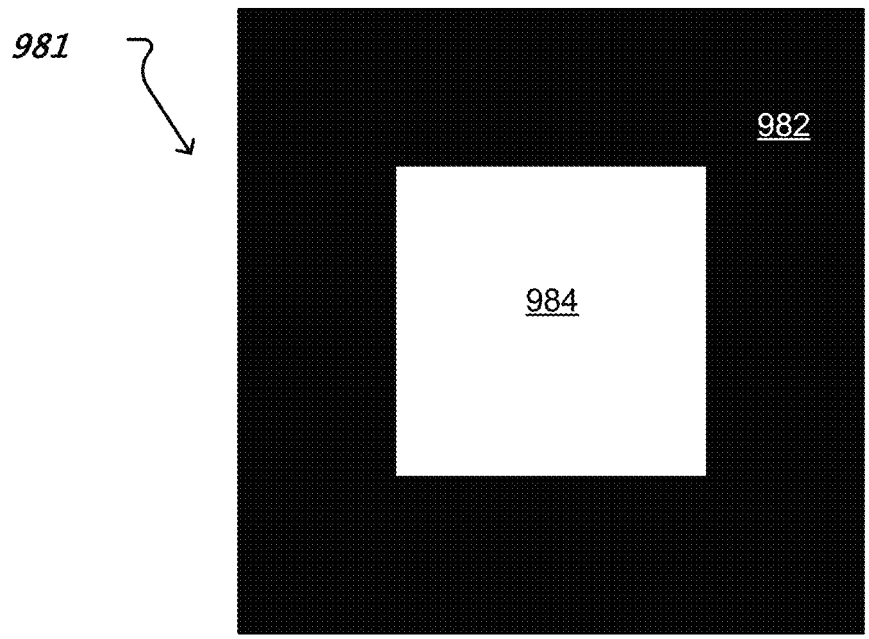
Figure 9E:
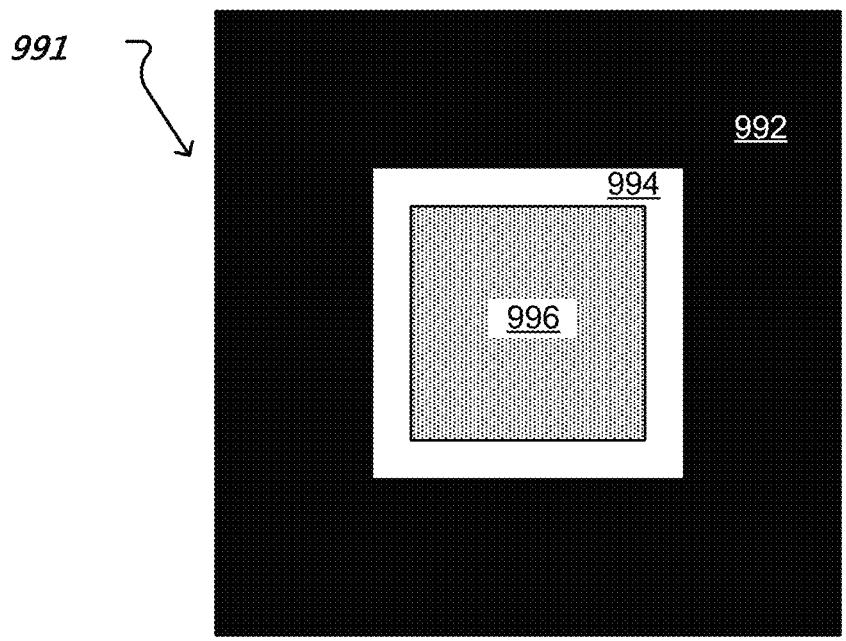

FIGS. 9A, 9B, and 9C show images of another example of a 3D structure printed without and with edge enhancement from the same digital model. Further, FIGS. 9D and 9E show examples of slice images that are used to print the 3D structure. FIG. 9A shows an image 901 of a 3D structure that was printed without and with vertical edge enhancement from the same digital model. The upper portion 920 of the image 901 was printed without vertical edge enhancement. The lower portion 930 of the image 901 was printed with vertical edge enhancement. FIG. 9B shows a magnified image 951 of the 3D structure that corresponds to the upper portion 920 of FIG. 9A. FIG. 9C shows an image 971 of the 3D structure that corresponds to the lower portion 930 of FIG. 9A that was printed with vertical edge enhancement. As compared to FIG. 9B, scalloping is reduced in FIG. 8C resulting in smoother edges. FIG. 9D shows an example of a slice image 981 that is used to print the upper portion 920 of the image 901 of FIG. 9A. The slice image 981 includes a region 982 of black pixels, and a region 984 of white pixels. FIG. 9D shows an example of a slice image 991, transformed by an edge enhancement process, that is used to print the lower portion 930 of the image 901 of FIG. 9A. The slice image 991 includes a region 992 of black pixels, a region of white pixels 994, and a region 996 of grayscale pixels.

In some implementations, a system can include a processor; and a memory structure coupled with the processor, the memory structure configured to store an original image corresponding to a slice of a three-dimensional model prepared for printing on a three-dimensional printer that uses a photopolymer to create a three-dimensional structure. The processor can be configured to perform operations comprising: accessing a pixel reduction factor that is associated with an increased exposure duration parameter, wherein the increased exposure duration parameter is greater than an unmodified exposure duration parameter associated with the photopolymer; classifying pixels of the original image to identify interior pixels of the original image and exterior pixels of the original image; reducing intensity levels of the interior pixels by the pixel reduction factor so that printing areas of the three-dimensional printer corresponding to the interior pixels receive first curing doses under the increased exposure duration parameter and the reduced intensity levels that are comparable to doses received under an unmodified exposure duration parameter and unreduced intensity levels; maintaining intensity levels of the exterior pixels so that printing areas of the three-dimensional printer corresponding to the exterior pixels receive second curing doses under the increased exposure duration parameter that are greater than doses associated with the unmodified exposure duration parameter; and outputting a modified image based on the reduced intensity levels and the maintained intensity levels that correspond to the slice for printing on the three-dimensional printer.

A three-dimensional printer can include a vat capable of holding a liquid comprising a photopolymer, the vat including a window. The printer can include a memory structure to store information including an original image corresponding to a slice of a three-dimensional model prepared for creation of a three-dimensional structure via the three-dimensional printer. The printer can include a build plate configured and arranged to move within the vat during three-dimensional printing of the three-dimensional structure on the build plate. The printer can include a light projection device to project light through the window. The printer can include a controller to control the printing of the three-dimensional structure, movement of the build plate, and light modulation of the light projection device.

The controller can be configured to perform operations that include accessing a pixel reduction factor that is associated with an increased exposure duration parameter, wherein the increased exposure duration parameter is greater than an unmodified exposure duration parameter associated with the photopolymer; classifying pixels of the original image to identify interior pixels of the original image and exterior pixels of the original image; reducing intensity levels of the interior pixels by the pixel reduction factor so that printing areas of the three-dimensional printer corresponding to the interior pixels receive first curing doses under the increased exposure duration parameter and the reduced intensity levels that are comparable to doses received under an unmodified exposure duration parameter and unreduced intensity levels; maintaining intensity levels of the exterior pixels so that printing areas of the three-dimensional printer corresponding to the exterior pixels receive second curing doses under the increased exposure duration parameter that are greater than doses associated with the unmodified exposure duration parameter; and creating a modified image based on the reduced intensity levels and the maintained intensity levels that correspond to the slice for printing. Operations can include printing the slice in accordance with the modified image to build a portion of the three-dimensional structure; and controlling the light projection device based on the increased exposure duration parameter when printing the slice in accordance with the modified image to build the portion of the three-dimensional structure.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by, and/or under the control of, one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Other embodiments are within the scope of the following claims.

What is claimed is:

1. A method comprising:
   accessing, by a data processing apparatus, an original image corresponding to a slice of a three-dimensional model prepared for printing on a three-dimensional printer that uses a photopolymer to create a three-dimensional structure;
   accessing a pixel reduction factor that is associated with an increased exposure duration parameter, wherein the increased exposure duration parameter is greater than an unmodified exposure duration parameter associated with the photopolymer;
   classifying pixels of the original image to identify interior pixels of the original image and exterior pixels of the original image;
   reducing intensity levels of the interior pixels by the pixel reduction factor so that printing areas of the three-dimensional printer corresponding to the interior pixels receive first curing doses under the increased exposure duration parameter and the reduced intensity levels that are comparable to doses received under an unmodified exposure duration parameter and unreduced intensity levels;
   maintaining intensity levels of the exterior pixels so that printing areas of the three-dimensional printer corresponding to the exterior pixels receive second curing doses under the increased exposure duration parameter that are greater than doses associated with the unmodified exposure duration parameter; and
   outputting a modified image based on the reduced intensity levels and the maintained intensity levels that correspond to the slice for printing on the three-dimensional printer.

2. The method of claim 1, comprising:
   sending the modified image to the three-dimensional printer; and
   controlling the three-dimensional printer to use the increased exposure duration parameter when printing the slice in accordance with the modified image to build a portion of the three-dimensional structure.

3. The method of claim 2, wherein controlling the three-dimensional printer to use the increased exposure duration parameter comprises sending the increased exposure duration parameter to the three-dimensional printer.

4. The method of claim 1, wherein the increased exposure duration parameter is selected to increase a curing quality at edges of the three-dimensional structure.

5. The method of claim 1, comprising:
   reducing a build area represented by the original image to preserve dimensional accuracy under the increased exposure duration parameter, wherein classifying pixels of the original image comprises using the reduced build area to identify the interior pixels and the exterior pixels.

6. The method of claim 1, wherein classifying the pixels comprises:
   accessing neighboring pixels of a target pixel of the original image, the target pixel having an intensity level greater than a black intensity level;
   classifying the target pixel as an exterior pixel if one or more of the neighboring pixels have the black intensity level; and
   classifying the target pixel as an interior pixel if all of the neighboring pixels have an intensity level greater than the black intensity level.

7. A system comprising:
   a processor; and
   a memory structure coupled with the processor, the memory structure configured to store an original image corresponding to a slice of a three-dimensional model prepared for printing on a three-dimensional printer that uses a photopolymer to create a three-dimensional structure,
   wherein the processor is configured to perform operations comprising:
      accessing a pixel reduction factor that is associated with an increased exposure duration parameter, wherein the increased exposure duration parameter is greater than an unmodified exposure duration parameter associated with the photopolymer;
      classifying pixels of the original image to identify interior pixels of the original image and exterior pixels of the original image;
      reducing intensity levels of the interior pixels by the pixel reduction factor so that printing areas of the three-dimensional printer corresponding to the interior pixels receive first curing doses under the increased exposure duration parameter and the reduced intensity levels that are comparable to doses received under an unmodified exposure duration parameter and unreduced intensity levels;
      maintaining intensity levels of the exterior pixels so that printing areas of the three-dimensional printer corresponding to the exterior pixels receive second curing doses under the increased exposure duration parameter that are greater than doses associated with the unmodified exposure duration parameter; and outputting a modified image based on the reduced intensity levels and the maintained intensity levels that correspond to the slice for printing on the three-dimensional printer.

8. The system of claim 7, wherein the operations comprise:

sending the modified image to the three-dimensional printer; and controlling the three-dimensional printer to use the increased exposure duration parameter when printing the slice in accordance with the modified image to build a portion of the three-dimensional structure.

9. The system of claim 8, wherein controlling the three-dimensional printer to use the increased exposure duration parameter comprises sending the increased exposure duration parameter to the three-dimensional printer.

10. The system of claim 7, wherein the increased exposure duration parameter is selected to increase a curing quality at edges of the three-dimensional structure.

11. The system of claim 10, wherein the pixel reduction factor is selected based on the increased exposure duration parameter to eliminate or minimize over-curing for interior areas within the three-dimensional structure.

12. The system of claim 7, wherein the operations comprise:

reducing a build area represented by the original image to preserve dimensional accuracy under the increased exposure duration parameter, wherein classifying pixels of the original image comprises using the reduced build area to identify the interior pixels and the exterior pixels.

13. The system of claim 7, wherein classifying the pixels comprises:

accessing neighboring pixels of a target pixel of the original image, the target pixel having an intensity level greater than a black intensity level;

classifying the target pixel as an exterior pixel if one or more of the neighboring pixels have the black intensity level; and classifying the target pixel as an interior pixel if all of the neighboring pixels have an intensity level greater than the black intensity level.

14. The method of claim 4, wherein the pixel reduction factor is selected based on the increased exposure duration parameter to eliminate or minimize over-curing for interior areas within the three-dimensional structure.

15. The system of claim 7, wherein the three-dimensional printer comprises a vat capable of holding a liquid comprising one or more photoactive resins.

16. The system of claim 15, wherein the vat includes a window.

17. The system of claim 15, wherein the three-dimensional printer further comprises a light projection device to project light sufficient to cure the one or more photoactive resins in at least a portion of the liquid, wherein the processor is further configured to control light modulation of the light projection device.

18. The system of claim 17, wherein the processor is further configured to control the light projection device based on the increased exposure duration parameter when printing the slice in accordance with the modified image.

19. The system of claim 15, wherein the three-dimensional printer further comprises a build plate configured and arranged to move relative to the vat during printing of at least a portion of the three-dimensional structure, wherein the processor is further configured to control the movement of the build plate relative to the vat.

20. The system of claim 7, further comprising the three-dimensional printer.

* * * * *